Dec. 6, 1966   J. A. MAURER   3,289,561
FOCAL PLANE SHUTTER

Filed Aug. 20, 1964   6 Sheets-Sheet 1

J. A. MAURER
INVENTOR.

BY Jacque L. Meister
AGENT.

J. A. MAURER
INVENTOR.

BY Jacque L. Meister
AGENT.

Dec. 6, 1966  J. A. MAURER  3,289,561
FOCAL PLANE SHUTTER
Filed Aug. 20, 1964  6 Sheets-Sheet 4

J. A. MAURER
INVENTOR.

BY Jacques L. Meister
AGENT.

Dec. 6, 1966    J. A. MAURER    3,289,561
FOCAL PLANE SHUTTER
Filed Aug. 20, 1964    6 Sheets-Sheet 5

J. A. MAURER
INVENTOR.

BY Jacque L. Meister
AGENT.

Dec. 6, 1966        J. A. MAURER        3,289,561

FOCAL PLANE SHUTTER

Filed Aug. 20, 1964        6 Sheets-Sheet 6

J. A. MAURER
INVENTOR.

BY *Jacques L. Meister*

AGENT.

United States Patent Office 3,289,561
Patented Dec. 6, 1966

3,289,561
FOCAL PLANE SHUTTER
John A. Maurer, Somerset, N.J., assignor to Chicago Aerial Industries, Inc., Barrington, Ill., a corporation of Delaware
Filed Aug. 20, 1964, Ser. No. 390,864
12 Claims. (Cl. 95—57)

This invention relates generally to focal plane shutters and more particularly to improvements in focal plane shutters of the type used in aerial photography.

The improved shutter of the present invention, in common with many other focal plane shutters, has two curtains. Each shutter curtain comprises a normally rectangular opaque or solid portion having a pair of spaced apart bands extending from one edge thereof and defining an open portion therebetween. The two shutter curtains are positioned with their open portions juxtaposed to form an exposure slit therebetween. The width of the slit formed between the two curtains is adjusted by varying the relative positions of the two curtains and this in turn controls the effective duration of the exposure as the slit is swept across the exposure area of an associated camera at a substantially constant speed.

Once the shutter is ready for operation, a cycle of operations consists of a rundown part and a rewind part. During the rundown part, the exposure slit defined by the two curtains traverses the exposure area to effect an exposure. This movement of the exposure slit occurs when the two curtains are unrolled from a common feed roller on one side of the exposure area and are simultaneously wound upon separate, spring driven, take-up rollers on the opposite side of the exposure area. Immediately after the exposure, a winding part occurs during which the exposure slit is first "capped." Capping occurs when the leading curtain is moved through a distance sufficient to close the exposure slit between the two curtains so that no light can pass between them. After capping has occurred, the two shutter curtains are simultaneously caused to move back across the exposure area to their initial position wound upon a common feed roller. The return of the curtains to their initial position effects the winding of the powerful springs placed internally of the take up rollers onto which the respective curtains are wound during the rundown part of the shutter cycle. At the end of the winding part of the shutter cycle, the shutter slit is again re-established at a preset width in readiness for another cycle of shutter operation.

Shutters of the type having dual spring powered take-up rollers and a single feed roller on the opposite side of the exposure area from the take-up rollers are known in the prior art and are used when a shutter featuring accurate repetitive control of shutter slit width is required. These features are achieved with this type of shutter because of the common feed roller which effectively ties the two curtains together thus forcing the curtains to retain their position relative to each other during the rundown or exposure interval. However, most of the prior art shutters of this type have been unable to effect capping of the shutter exposure slit during rewind and hence required accessory blind shutters to mask the exposure area during the rewind part of the shutter cycle. Still others of the prior art shutters of this type have relatively complicated or inaccurate means for adjusting shutter slit width or for effecting shutter tripping.

Accordingly, it is a general object of this invention to provide a new and improved focal plane shutter which overcomes the above recited and other difficulties encountered with the prior art designs.

More particularly, it is an object of this invention to provide a new and improved focal plane shutter which is characterized by a unique shutter exposure slit width adjusting mechanism.

Another object of this invention is to provide an improved focal plane shutter with a novel exposure slit width adjusting mechanism which simultaneously provides for shutter capping during the rewind part of the shutter's cycle of operation.

Yet another object of this invention is to provide an improved focal plane shutter amenable to relatively high cycle rates and yet relatively free of vibration.

It is still another object of this invention to provide an improved focal plane shutter of inherently simple construction, yet highly reliable and possessing greater shutter slit width accuracy control than achievable with prior art shutters of the same general type. These and other objects of the invention which will become apparent as the invention is described, are attained by a construction in which each curtain has an individual roller upon which it is wound during the rundown part of the shutter exposure cycle and shares a common feed roller upon which it is wound during the rewind part of the cycle. However, one of the two shutter curtains passes around an auxiliary roller prior to joining the other curtain on the common feed roller. The auxiliary roller is movable relative to the common feed roller and effects changes in the shutter exposure slit width by changing the relative positions of the exposure slit defining edges of each of the two shutter curtains. The movable roller is also reciprocated during the shutter cycle to effect the capping of the shutter which is performed during the rewind part of the shutter cycle.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

Figure 1:
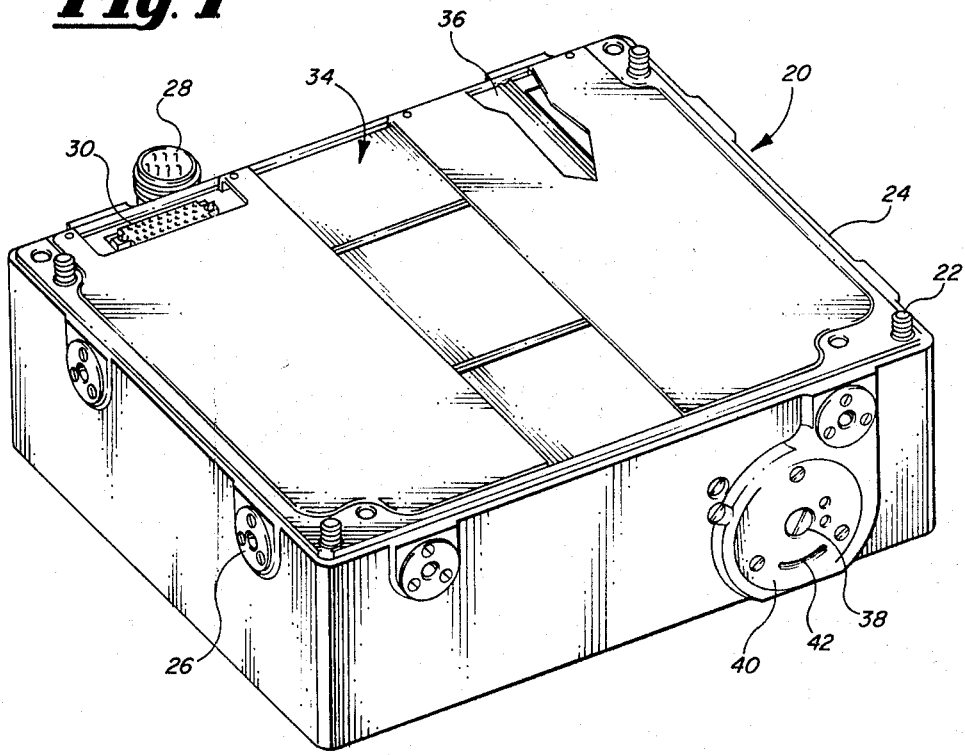
FIGURE 1 is a perspective view illustrating the external appearance of a complete embodiment of focal plane shutter assembly in accordance with the invention.
Figure 2:
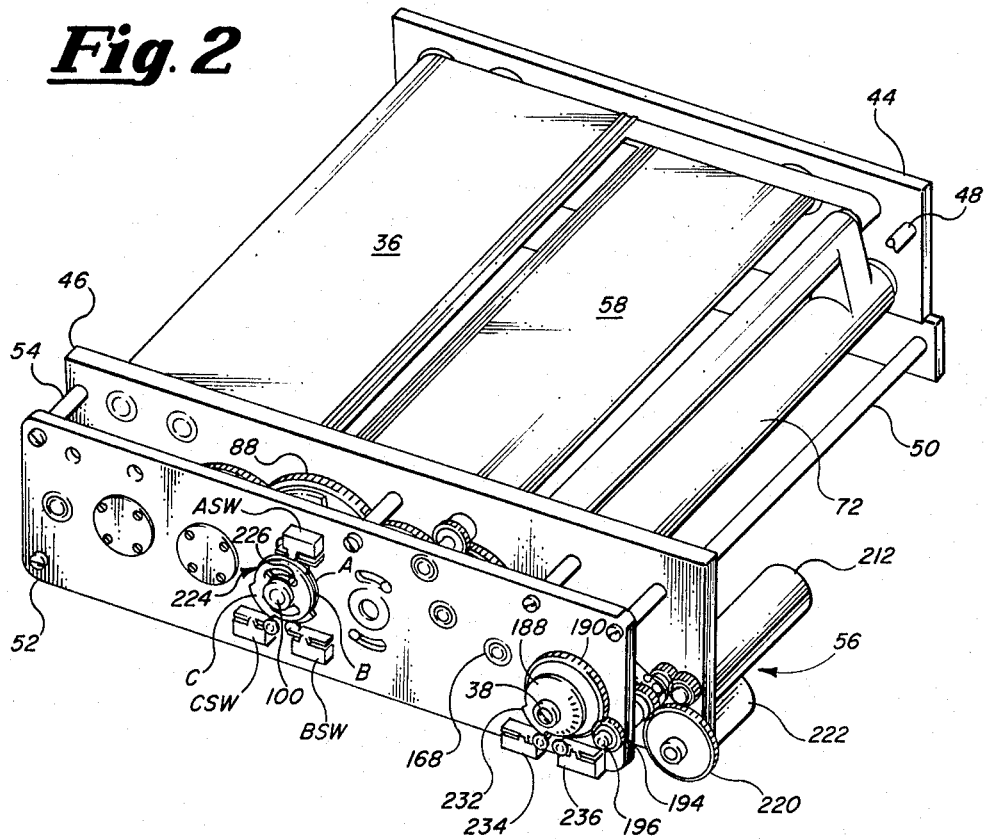
FIGURE 2 illustrates the complete shutter mechanism ready for installation in the outer protective case of the shutter assembly.

Referring now to the drawing, and more particularly to FIGURES 1 and 2 thereof, there is shown an illustrative focal plane shutter assembly embodying the present invention. While the focal plane shutter assembly shown in FIGURES 1 and 2, and in the other detailed figures comprises a preferred embodiment of the invention, those skilled in the art will appreciate that this preferred embodiment is merely illustrative of the novel features of the present invention and that other constructions embodying the invention may be made and used without departing from the novel principles thereof.

FIGURE 1, illustrates the appearance of the complete shutter assembly 20 before its assembly to a camera film drive body and optical components. Captive bolts 22 provide means for such assembly. Case 24 carries thereon a plurality of trunnion bearings 26 for use in supporting the complete camera in a camera mount. Male connector 28 and female connector 30 provide electrical interconnections to camera control system and camera electrical circuitry, respectively. Plate 32 has therein a format opening 34, defining the exposure area and further, serves to protect the shutter curtains during off camera handling of the shutter assembly. Leading curtain 36 is shown in its cocked position as viewed through a break in the plate 32. Exposure setting knob 38 protrudes outward from the inner shutter mechanism to terminate flush with the outer surface of case 24 and exposure dial face 40. Exposure dial face 40 has an arcuate slot 42 through which can be observed the exposure index cam and indicia thereon illustrated and described in connection with FIGURE 2.

As shown in FIGURE 2, the focal plane shutter assembly comprises a side plate and a mechanism plate which are positioned in spaced parallel relationship for supporting a pair of shutter curtains therebetween. Thus, the shutter assembly advantageously comprises a side plate 44 and an inner mechanism plate 46 which are spaced from each other by a plurality of frame tie rods, two of which are identified as 48 and 50 in the drawing. As will be appreciated, other frame tie rods are necessary and utilized in other locations to space apart the side plate and inner mechanism plate. However to maintain drawing simplicity these additional tie rods have not been shown.

As also shown in FIGURE 2 an outer mechanism plate 52 is positioned in spaced parallel relationship to inner mechanism plate 46 by spacer posts 54 for supporting shutter drive mechanism therebetween and thereon. Thus, the leading shutter curtain 36 and following curtain 58 are supported between side plate 44 and inner mechanism plate 46, and drive mechanism for these curtains is supported between the inner mechanism plate 46 and the outer mechanism plate 52. The shutter operating mechanism supported on and between the inner and outer mechanism plates is exemplified by the slit width adjusting servo generally indicated at 56 and utilized for effecting the adjustment of the width of the slit between the leading and following shutter curtains.

Figure 3:
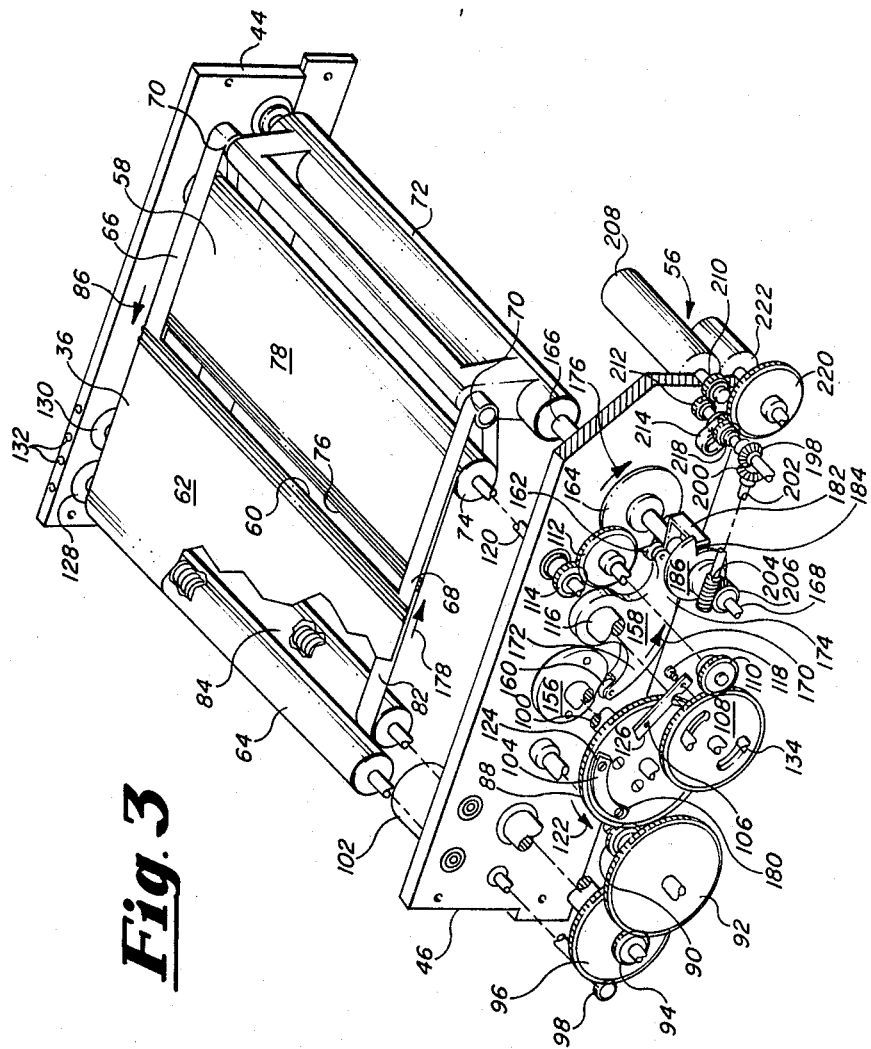
FIGURE 3 is an exploded view, partially broken away, of a preferred illustrative embodiment of the focal plane shutter of the invention.

Each focal plane shutter curtain is adapted to be driven during the rundown part of the shutter cycle by an individual spring roller associated therewith and is subsequently rewound by an electric motor acting through a gear and cam drive train. Referring more specifically to FIGURE 3 and to the following curtain 58, it can be seen that curtain 58 is defined by a reinforced following edge 76, and a main body portion 78, which is shown as wound around a curtain feed roller 74 to which it is secured. In addition, a pair of following curtain drive bands 80 and 82 extend from the reinforced edge 76 of the following curtain 58 and are secured to following curtain spring roller 84 so as to be wound therearound upon release of the curtain feed roller 74 and the concomitant spring powered rotation of roller 84.

In a similar fashion, the leading curtain 36 is provided with a reinforced leading edge 60, a main body portion 62 adapted to be secured to leading curtain spring roller 64 so as to be wound therearound upon rotation of that roller. In addition, a pair of leading curtain drive bands 66 and 68, extend from the leading edge 60 and are wound around a pair of freely rotatable guide rollers 70 supported on an oscillatable support lever 72. Advantageously each of the leading curtain bands 66 and 68 is secured to curtain feed roller 74 so as to be unwound therefrom upon release of curtain feed roller 74 and is subsequently wound upon spring roller 64. The reinforced edges 60 and 76 of the leading and following curtains 36 and 58, together define an aperture between the curtains. This aperture is the exposure slit. The oscillatable lever means 72 is controllably oscillated during the shutter cycle between a first and a second limit of angular travel which limits correspond respectively to an exposure slit defining position and a curtain capped position. The means defining the limits of oscillation and the manner and means for achieving the oscillation between these limits is described in detail hereinbelow.

The reinforced leading edges 76 and 60 are fabricated in a known manner not forming a part of the present invention. One satisfactory manner of achieving the reinforced edges is shown and described in connection with FIGURES 8 and 9 of the United States Patent No. 3,087,401, of J. A. Maurer et al. Further, while a pair of guide rollers 70 have been shown, obviously the pair of rollers could be replaced with a single roller supported by the oscillatable lever means 72. However, use of two rollers has proven advantageous because curtain tracking is generally superior to that achieved when a single guide roller is used.

Figure 4:
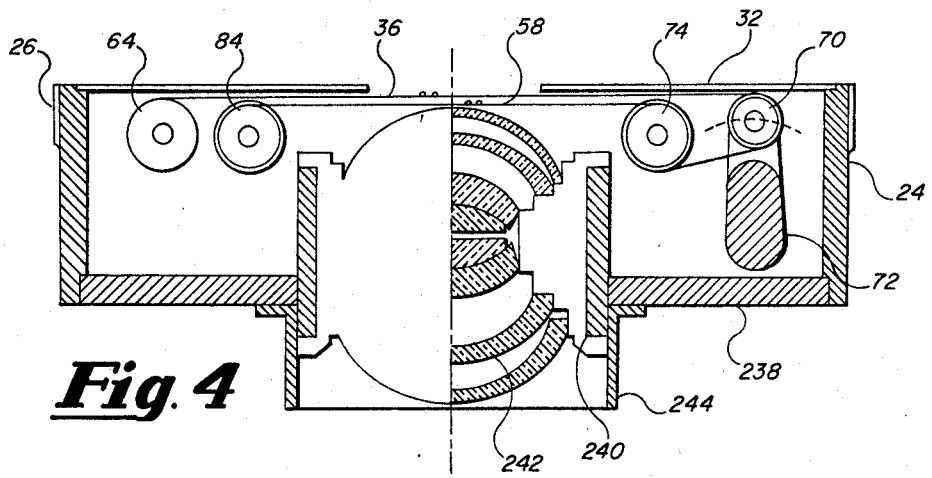
FIGURE 4, is a schematic showing the relationship of the principal shutter curtain mechanical elements and a typical wide angle lens in a camera.

FIGURE 4, schematically illustrates the relationship of the principal shutter curtain elements when assembled within case 24 and with relation to a typical wide angle lens. A lens board 238 secured to case 24 by suitable fastening means, not shown, but which typically include screws and dowels to effect precise positioning of the lens board, supports a lens mount 240. Lens mount 240 in turn provides mounting means for the optical lens system employed with the inventive shutter assembly. The lens 242 schematically shown in the drawing is a typical wide angle aerial photographic lens. A sun shield 244 secured to lens board 238 provides physical protection for lens 242 as well as a mounting means for the filters or lens caps often employed with aerial cameras.

In the operation of the invention, leading curtain 36 and following curtain 58 are driven in the direction of the arrow 86 during the rundown or exposure portion of the shutter cycle by the spring bias force of spring roller 64 and spring roller 84, respectively. At the end of this portion of the cycle, the leading and following curtains are returned to their rewound or initial position and their associated spring roller assemblies have their spring bias restored under the impetus of a motor which drives curtain feed roller 74 through a gear and cam mechanism train to complete the shutter cycle.

In accord with a feature of this illustrative embodiment of the invention, actuation of a drive means initiates rundown of the shutter curtains 36 and 58. The drive means comprises a shutter control gear 88 secured to a cam shaft 100 and driven by a pinion 90. Pinion 90 is secured to spur gear 92 which, in turn, is driven through the gear reduction drive train comprising pinion 94 and spur gear 96 meshed with the output pinion 98 of drive motor 102. As explained in greater detail hereinbelow and with particular reference to FIGURE 6 of the drawing, the motor 102 is adapted to be electrically energized and controlled to supply driving power to the shutter control gear 88 by means of the above described gear train to cause one continuous rotation of that gear during each shutter cycle. Cam shaft 100 is freely rotatable in bearings carried by the inner and outer mechanism plates 46 and 52, respectively.

Motor 102 may advantageously comprise a combination motor-transmission brake as described in the copending application of John A. Maurer et al., Serial No. 260,283, filed February 21, 1963, now issued as Patent No. 3,180,414. However, as will be apparent to those versed in the shutter art, the motor could also in certain embodiments take the form of a motor alone without the speed reduction gearing and brake features present in the above referenced Maurer et al. application. In such an instance any motor having good speed control characteristics and sufficient power can be used; one such motor that has been employed as an alternate to the combination motor-clutch-brake is of the governor controlled D.C. series type.

Figure 8:
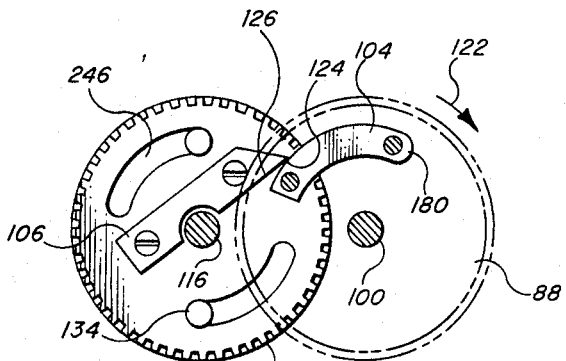
FIGURES 8, 9 and 10 illustrate the relationship between the shutter release and rewind elements at various times during a shutter cycle.
Figure 9:
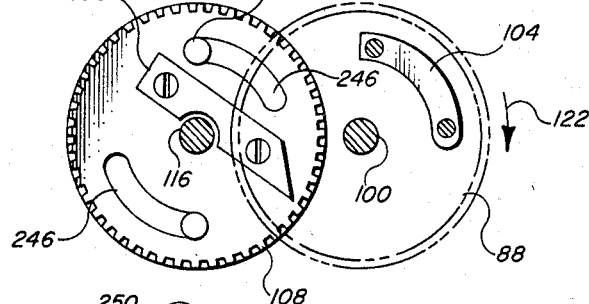

As shown, a shutter rewind driver 104 is securely fastened to shutter control gear 88 for rotation therewith. A shutter rewind gear 108 position controlled by rewind driver 104 as subsequently described is secured to shaft 116 and rotates therewith in bearings provided in the inner and outer mechanism plates 46 and 52. A shutter rewind member 106 is securely fastened to shutter rewind gear 108 as by screws 118 and in the rewound or initial position engages rewind driver 104 as shown in FIGURE 8. Meshed with shutter rewind gear 108 is pinion 110 forming part of a speed reduction gear train comprised of spur gear 112 and curtain feed roller gear 114. Gear 114 is securely affixed to the shaft 120 of curtain feed roller 74 for rotation therewith. Thus, when shutter control gear 88 together with its shutter rewind driver 104 is rotated in the direction of arrow 122 under the impetus of motor 102, the trailing surface 124 of driver 104 is moved out from beneath the leading bottom surface 126 of rewind member 106 effecting release of shutter curtains 36 and 58 which move under the impetus of their respective spring rollers 64 and 84 to transport the exposure slit across the format opening 34. The position of shutter control gear 88, rewind driver 104 and rewind member 106 on rewind gear 108, relative to each other after release of the curtains and transport of the exposure slit across the format opening 34, is best shown in FIGURE 9.

As generally indicated in FIGURE 3, both the leading and following curtains' spring rollers 64 and 84 may advantageously be of nearly identical construction and of the type that has become well known in the shutter art as a spring curtain roller. In such a construction, a helical torsion spring wound inside of the roller is affixed at one end to the roller and at the other end to the roller shaft to provide rotational torque to the roller when the spring is wound. In the present embodiment, the shafts of the spring rollers, 64 and 84 advantageously are not directly prevented from rotating in side plate 44 but, instead, the shafts terminate in capstans 128 and 130, secured to and coaxial with the fixed shafts of the spring rollers 64 and 84. Capstans 128 and 130 each have portions received into apertures provided in side plate 44 and are secured against rotation in these apertures by means which may conveniently take the form of set screws 132 or any other suitable fastener.

It is a feature of this invention that both spring curtain roller assemblies 64 and 84 have their internal torsion springs maintained under a pre-tension which is not released completely when the shutters have reached their rundown condition. This pre-tension permits both a lower stress ratio in the springs and an assurance that the springs will be operated at the most nearly linear portion of their deflection-force curve characteristics. As can be understood from the drawing, this pre-tension may readily be set into the curtain roller torsion springs by releasing set screws 132 and suitably rotating capstans 128 or 130 to achieve the tension desired. When that tension has been achieved, merely re-tightening set screws 132 will cause the desired pre-tension to be retained.

Proceeding again with the description of the operation of the inventive focal plane shutter, it has been described how operation is initiated by the rotation of the trailing edge of shutter rewind driver 104 from beneath the leading bottom surface 126 of rewind member 106. When contact between these two is broken effecting the release of curtain feed roller 74, spring curtain rollers 64 and 84 begin to rotate drawing their associated shutter curtain across the exposure area. The displacement diagram of the shutter curtains is shown graphically in FIGURE 7 of the drawing. In this graph, the ordinates correspond to the position of the leading edge of the leading curtain in terms of inches traveled while the abscissae correspond to time in milliseconds and to rotation of shutter control gear 88 in degrees. The zero time and zero cam rotation point on the horizontal axis of the chart indicates when the cycle is initiated and the curve extends for a full cycle time displacement period ending with the shutter rewound and in readiness for a new cycle.

Figure 5:
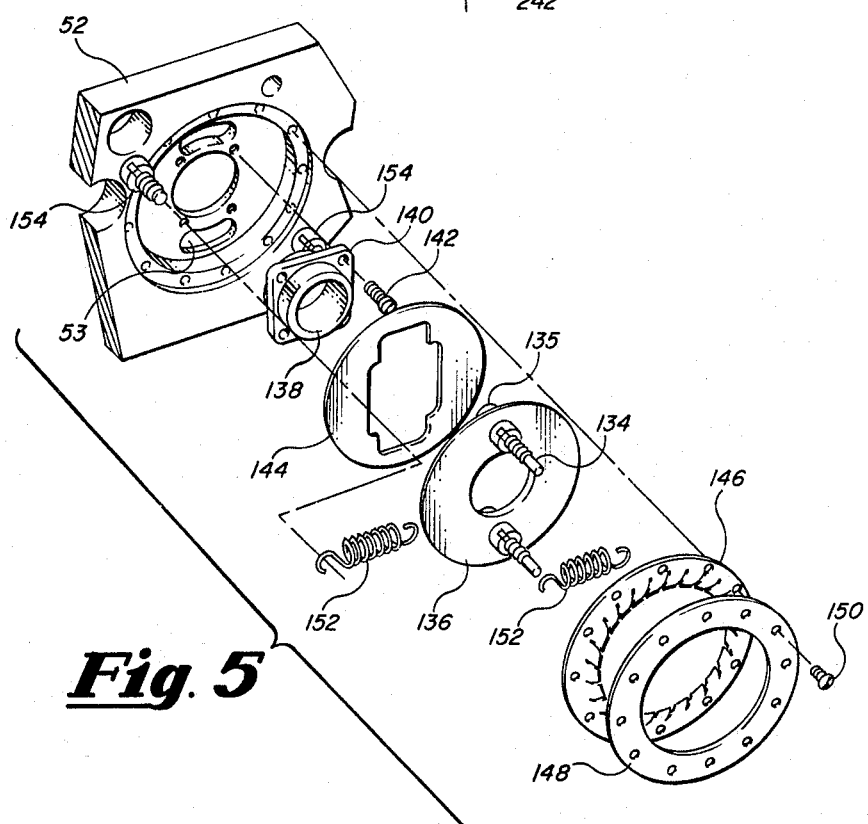
FIGURE 5, is a perspective view in partially exploded form showing the curtain brake employed in one curtain embodiment.
Figure 7:
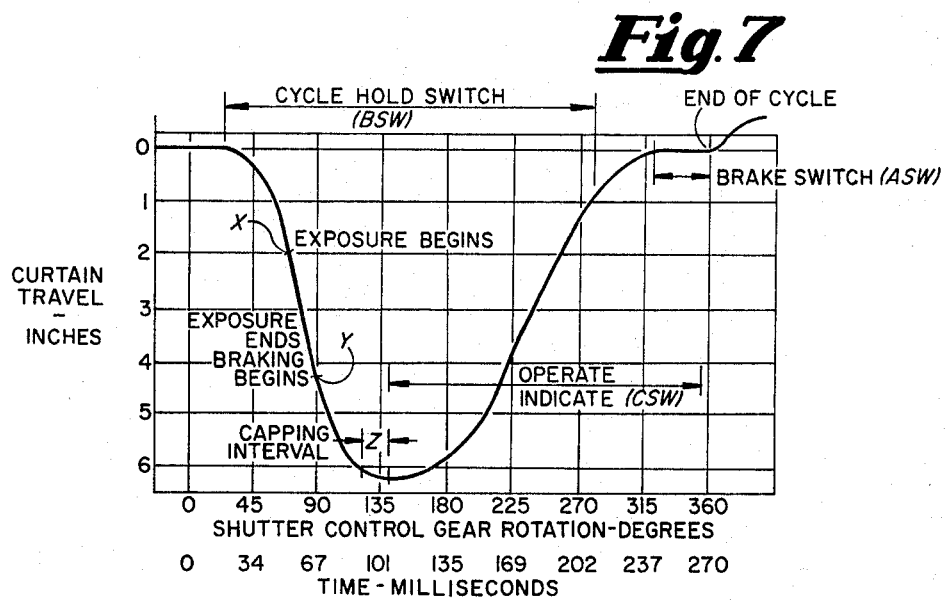
FIGURE 7, is a graph illustrating curtain travel as a function of time and control gear rotation during one complete cycle of operation of the inventive shutter.

At the zero time point, the leading edge 126 of the shutter rewind member 106 is resting upon the trailing surface 124 of shutter rewind driver 104 as shown in FIGURE 8. This condition is maintained for approximately 30° of control gear rotation or to about 30 milliseconds after the initial starting impulse at which time contact is broken between rewind driver 104 and rewind member 106. When contact is broken, the helical torsion springs of the take-up roller assemblies are permitted to pull the curtains across the format area in the direction of arrow 86. During the time interval from about 30 milliseconds to about 60 milliseconds, or to point X on the curve which designates the start of exposure, the shutter curtains accelerate toward their desired format traversing velocity. In the particular embodiment shown and described, the curtain acceleration is 10,150 inches per second$^2$ and the format traversing velocity achieved by the exposure slit is substantially 200 inches per second. Approximately 12 milliseconds after exposure commences, it terminates at the point indicated as Y in the diagram. The relationship between the shutter rewind driver 104, rewind member 106 and rewind gear 108 at the termination of the exposure interval is shown in FIGURE 9. After the exposure period has been terminated, or after point Y on the curve of FIGURE 7, the curtains continue to travel while they are decelerated and finally brought to rest when they reach the point shown as the lowest point on the curve. This point is reached approximately 90 milliseconds after exposure initiation. The controlled deceleration from point Y to the at rest position at the bottom of the curve of FIGURE 7 is provided by the novel brake mechanism best shown in FIGURE 5 of the drawing. The brake of FIGURE 5 acts upon shutter rewind gear 108 when the gear, driven by the moving shutter curtains and rotating in the direction of the arrow 248 shown in FIGURE 9 has reached a point corresponding to the end of the exposure interval. This point is shown in FIGURE 9 and also corresponds to the end of the clear path in each of the two arcuate slots 246 cut in rewind gear 108 and occupied by the tip of a spring stud 134 of the brake assembly.

As shown, spring studs 134 are affixed to a swinging disc 136 by means of nuts 135. As a result, when the ends of the arcuate slots 246 of rewind gear 108 contact spring studs 134 they cause rotation of swinging disc 136 about the flange portion 138 of brake pivot plate 140. Pivot plate 140 is secured to the outer mechanism plate 52 by means of screws 142 or other suitable fastening means. As swinging disc 136 is rotated, it is held in contact with a non-rotating friction disc 144 by means of brake spring 146 retained by spring disc 148 and suitable fasteners 150. Friction disc 144 is secured against rotation by its shaped central aperture fitted about pivot plate 140 and additionally by being cemented to the surface of the counterbored recess it occupies in outer mechanism plate 52. Brake spring 146 has a plurality of formed tines which press spring-like against swinging disc 136 to maintain it in contact with friction disc 144. Friction disc 144 advantageously is comprised of a material having a uniform and high coefficient of sliding friction, melamine-asbestos materials having proved satisfactory in this application. Springs 152 connected between spring studs 134 and spring studs 154 resist the rotation of swinging disc 136 as the curtains are being decelerated and, during the rewind portion of the shutter cycle, apply restoring forces to swinging disc 136 to reposition it in its initial position ready to again apply braking force to decelerate the shutter curtains after an exposure. Since the shutter rewind gear 108 is engaged with spring studs 134, the decelerating forces of friction and spring tension in the brake assembly are applied through that gear and its associated gear train to the shutter curtains. Maximum travel of the curtains and the brake assembly is established by the limit of travel of the nuts 135 of spring studs 134 which are positioned in and engage the limits of arcuate slots 53 in mechanism plate 52 at the point of maximum curtain travel.

Immediately after the curtains have come to rest, the shutter capping cycle is initiated by the action of capping cam 156. Capping cam 156 is secured to and rotates with shutter control gear 88 which, as described above, makes one continuous rotation during each shutter cycle under the driving impetus of motor 102. Cam follower rocker 158 is a form of a crank and is freely rotatable on shaft 116 which carries the shutter rewind gear 108. The rocker 158 has a cam follower arm 172 and a cam actuator arm 174 which support identical rollers 160 and 162, respectively. Roller 160 on arm 172 contacts capping cam 156 during portions of that cam's rotation and roller 162 on arm 174 is in contact with slit capping control cam 164 which is in turn secured to shaft 166.

As capping cam 156 is rotated, cam follower rocker 158 is actuated when the rising portion of cam 156 acts upon the roller 160 of arm 172. This causes a rocking motion of rocker 158 about shaft 116 in the direction of arrow 170. Simultaneously therewith, roller 162 on arm 174 acts upon the slit capping control cam 164 to effect the rotation of cam 164 and its shaft 166 in the direction of arrow 176. Shaft 166 is secured to the oscillatable lever means 72 so that rotation of shaft 166 effects a similar rotation of the lever means from its first or exposure slit width defining limit of angular travel toward its second or curtain capping position. Shaft 166 is supported in bearings in the inner and outer mechanism plates 46 and 52, respectively.

As oscillatable lever means 72 is rocked in the direction of arrow 176, toward its second limit of travel, the guide rollers 70 carried thereon act upon the tapes 66 and 68 of the leading curtain 36 to effect movement of that curtain in the direction of arrow 178 independent of any movement of the following curtain 58. This rocking action continues until the oscillatable lever means reaches its second limit of angular travel as established by the maximum diameter of capping cam 156 acting on cam follower rocker 158 and causes the leading edge 60 of curtain 36 to overlap the following edge 76 of curtain 58 to effect capping of the shutter. As will be brought out below, the two curtains are maintained in this overlapped or capped condition by cam 156 until the two curtains are restored to their initial or starting position. The capping interval is shown as interval Z on the diagram of FIGURE 7.

Figure 10:
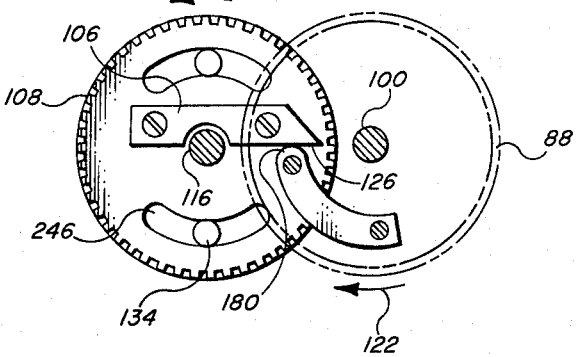

Immediately after capping has been completed and as shown in FIGURE 10, shutter rewind member 106 is lifted by the action of the leading edge 180 of shutter rewind driver 104 rotating with shutter control gear 88 in the direction of arrow 122. This lifting initiates the rewind part of the shutter cycle that returns the two shutter curtains to their initial or fully rewound position. As can be seen in FIGURE 7, the curtains generally follow a sine curve function during the rewind portion of the shutter cycle. As can also be seen, the rewind cycle is complete at approximately 315° of rotation of shutter control gear 88. Prior to that time, the motor operate switch is opened and the motor either coasts or is braked to a stop as discussed further hereinbelow.

The action of shutter rewind driver 104 upon shutter rewind member 106 effects rotation of shutter rewind gear 108 in the counter-clockwise direction indicated by arrow 250 in FIGURE 10. Rotation of shutter rewind gear 108 is transmitted through the reduction gear train comprised of pinion 110, spur gear 112 and curtain feed roller gear 114 to the curtain feed roller 74, to cause the following curtain 58 and the leading curtain tapes 66 and 68 to be wound thereabout and thus be returned to their initial position.

During the last 30° of rotation of shutter control gear 88 and capping cam 156, the decreasing diameter portion of cam 156 contacts roller 160. This releases the holding pressure on cam follower rocker 158 which is then moved in the opposite direction to that of arrow 170 by the action of the spring roller 64 on oscillatable lever means 72. Permitting the lever means 74 to rock toward its first or exposure slit defining position and, concomitantly, its guide rollers 70 to move in the direction of curtain feed roller 74, results in the re-establishment of the preselected exposure slit width. The preselected slit width is re-established when slit width control stop 182 rotating with slit capping control cam 164 contacts the stopping surface 184 of slit width control disc 186 which provides the first limit of angular travel of lever means 72.

It is an advantageous feature of this invention that the slit width between the edges of the leading and following curtains may be adjusted, as desired, by either manually setting the exposure setting knob 38 or remotely through use of the slit width adjusting servo elements generally indicated at 56. As shown in FIGURES 1 and 2, an exposure setting knob 38 terminates flush with the outer case 24. Adjusting knob 38 is shown as slotted to provide adjustment by means of a screw driver or the like. However, the knob may obviously be provided with a knurled periphery or other convenient manually graspable surface to enable adjustment of the slit width between the leading and following curtains. The knob 38 is fixedly secured to index cam 188 which bears indicia visible through the arcuate slot 42 in the exposure dial face 40. This indicia may advantageously be calibrated in terms of effective exposure speed and corresponds directly with shutter exposure slit width. Both the exposure setting knob 38 and the index cam 188, as well as, a spur gear 190 are securely affixed to an exposure setting shaft 192 not visible in the drawing but supported for free rotation in bearings mounted in the inner and outer mechanism plates 46 and 52. Gear 190 is meshed with gear 194 secured to exposure countershaft 196. Exposure countershaft 196 is also mounted for free rotation between the inner and outer mechanism plates.

As best shown in FIGURE 3, exposure countershaft 196 has affixed thereto a miter gear 198 which is meshed with another miter gear 200 affixed to exposure cross shaft 202. At the opposite end of exposure cross shaft 202 from miter gear 200, is a worm 204 meshed with a worm gear 206 which is mounted for free rotation about a reduced diameter portion 168 of shaft 166. Worm gear 206 is fixedly secured to slit width control disc 186. Thus, as the exposure setting knob 38 is rotated, the stopping surface 184 of the slit width control disc 186 is relocated in accord therewith. Repositioning of this surface in one direction or another effects a different stop position for the slit width control stop 182 and hence, of the exposure slit width between the two shutter curtains.

It is a feature of the invention that shutter slit width may also be remotely controlled in this illustrative embodiment by means of a servo system. This servoed slit width adjustment is achieved by the action of a two-phase servo motor 208 responding to a remotely established voltage command in a manner well known to those versed in the electrical arts. The output of motor 208 is transferred through its pinion 210 to a drive gear 212 rotatable about exposure countershaft 196. It is an advantageous feature of this servo system that drive gear 212 is spring detented to countershaft 196. The detenting action is achieved by means of clutch ball spring 214 acting against two balls 216 (not shown) retained in apertures in the hub of drive gear 212 and pressed against pocket-like recesses in shaft 196. By suitably choosing the tension of spring 214, it has been possible to provide the inventive shutter with the possibilities of manual slit width adjustment, as well as, servoed slit width adjustment.

This would not be possible if the coupling from the servo motor to the manual exposure setting knob were direct since the high inertia present in the servo motor drive system would then prevent rotation of knob 38. Also, if knob 38 were direct coupled to the motor, any rotation of the knob would establish a servo error signal and the servo motor would immediately tend to reset itself to its command voltage indicated position. Both of these disadvantages of direct coupling between the manual and servo controlled slit width adjusting systems have been overcome by the use of the detented servo drive. The servo loop is closed by means of gear 218 secured to gear 212 for rotation about shaft 196 and which in turn is meshed with gear 220 affixed to the output shaft of potentiometer 222. Potentiometer 222 provides the feedback voltage necessary to balance the servo control input signal.

Advantageously limit stops are provided for the slit width adjusting servo. These limit stops can be conveniently established electrically by means of snap action switches 234 and 236 operating by cam lobe 232 formed on index cam 188. As index cam 188 is rotated with varying exposures, it carries lobe 232 around actuating one or the other switches 234 or 236 at the appropriate limit of slit width. As shown, switches 234 and 236 are adjustably affixed to the outer mechanism plate 52. By suitably adjusting the position of the individual limit switches, precise limits on slit width can be established.

FIGURE 2 illustrates the mechanism by which the shutter is made to operate in response to electrical pulses and the mechanism by which the camera and its associated camera control system are made to operate in response to the shutter action. As shown in FIGURE 2, a switching cam assembly generally indicated at 224 is secured to cam shaft 100 for rotation therewith. Switching cam assembly 224 is formed of a plurality of parallel plate cams which are positioned in a side by side relationship for common rotation. As shown, one of the three cams present is affixed to the cam shaft 100 and the other two are adjustably clamped thereto by means of screws 226 operating in arcuate slots 228 in the two adjustably positioned cams. As will be appreciated from the description which follows, adjusting the two movable cams relative to their respective switches permits precise timing of the switch function relative to cam shaft rotation. In the embodiment illustrated, cam ring A is adapted for operative engagement with electrical switch ASW. Similarly cam rings B and C are adapted for operative engagement with electrical switches BSW and CSW, respectively. As shown the three switches, ASW, BSW and CSW advantageously may be small snap action switches positioned in operative relation to the switching cam assembly 224. While in this particular and illustrative embodiment of the inventive focal plane shutter assembly, the switching cam assembly is comprised of three separate plate cams, those skilled in the art will readily appreciate that the number of plate cams utilized may be greater or smaller in number depending upon the particular requirements of the associated camera and camera control system and the functions desired to be effected during shutter operation.

Figure 6:
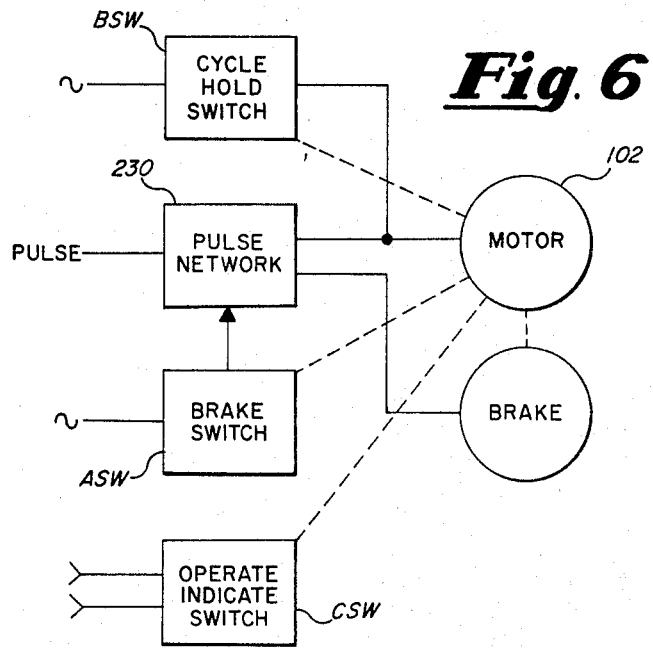
FIGURE 6, is a schematic in block diagram form illustrating the shutter wiring employed.

The explanation of the operation of switching cam assembly 224 and its affiliated electrical switches can be facilitated by reference to the graph of FIGURE 7 and the electrical schematic of FIGURE 6 of the drawing. Exposure initiation commences with the reception of a camera operate pulse from control system circuitry external to the shutter and forming no part of the invention. To insure that the operate pulse is of sufficient duration and of suitable form to properly initiate shutter operation, a pulse network 230 is provided. Pulse network 230 is activated by the operate pulse and responds by establishing an internally developed operate pulse of desired form and duration. As can be seen from FIGURE 7, this operate pulse must be more than about 30 milliseconds in length and, in the illustrative embodiment, it has been found advantageous to maintain this pulse for approximately 45 milliseconds. The pulse forming network in itself is conventional consisting of a relay and an RC holding network.

The pulse output from network 230 actuates motor 102 to set it and its output gear train in operation. Approximately 30 milliseconds after motor operation has commenced, cycle hold switch BSW is actuated and remains on applying external power to motor 102 until approximately 270° of cam shaft rotation has been effected or until about 200 milliseconds after the cycle initiate pulse.

During the time period from 100 milliseconds to just short of the end of the cycle or at about 265 milliseconds after shutter cycle initiation, the electrical switch CSW is actuated by its associated cam ring C to provide indications of proper operation to the camera control system. For example, actuations of electrical switch CSW are commonly utilized to operate electrical indicating lights during each shutter cycle and for operating suitable counters to effect a totalizing count of the number of exposures made.

In certain embodiments of the inventive shutter it has been found advantageous to incorporate an electrical brake on the motor output shaft to brake the shutter mechanism at the end of the shutter rewind cycle and to insure maintenance of the shutter in a fully rewound condition in readiness for the initiation of a new shutter cycle. Advantageously, this braking action can be controlled by switch ASW operating in conjunction with its associated cam ring A. When switch ASW and a brake are employed in the shutter mechanism, the output of the ASW switch is passed through separate switch contacts in the pulse network 230 to the brake. By passing the ASW switch impulse through the pulse network, removal of operating power from the brake can be reliably assured at the time of the receipt of a camera operate pulse. As described above the brake may advantageously be incorporated with the motor 102.

While there has been shown and described a specific embodiment of the present invention, it will of course be understood that this embodiment is merely illustrative and that various modifications and alternative constructions can be made without departure from the true spirit and scope of the invention. For example, although capping cam 156, rewind driver 104 and rewind member 106 have been illustrated and described as single lobe members actuated once per revolution of shutter control gear 88, with suitable re-design of the drive mechanism, two or more lobes or actuations per revolution of gear 88 are possible and feasible. Also, while in the embodiment shown and described herein, the position of the leading curtains' leading edge is adjusted relative to a fixed position of the following edge by settings of the slit width control disc 186, obviously the same or an equivalent adjustment of slit width could be achieved if the roles of the leading and following curtains were reversed relative to the guide rollers 70. Therefore, it is intended by the appended claims to cover all of such modifications and alternative constructions as fall within their true spirit and scope.

What is claimed as the invention is:

1. An improved focal plane shutter meachanism comprising
 a leading curtain means and a following curtain means,
 a spring powered take-up roller for each of said leading and following curtain means,
 a curtain feed roller common to both said leading and following curtain means,
 guide roller means for varying the position of said leading curtain means relative to said following curtain means,
 oscillatable lever means supporting said guide roller means for controllably oscillating the latter between a slit defining position and a curtain capped position, drive means for releasing said curtain feed roller to permit said spring powered take-up rollers to wind said leading and following curtain means thereon to thereby cause said curtain means to traverse an exposure area with an exposure slit of predetermined width therebetween, cam and rocker means coupled between said drive means and said oscillatable lever means for oscillating the latter from said slit defining position to said curtain capped position and for returning said lever means to said slit defining position, and limit means for establishing the slit defining position of said oscillatable lever means.

2. An improved focal plane shutter mechanism comprising leading and following curtain means, a curtain feed roller common to both said leading and following curtain means, a curtain feed roller common to both said leading and following curtain means, guide roller means for varying the position of said leading curtain relative to said following curtain, oscillatable lever means supporting said guide roller means for controllably oscillating the latter between a slit defining position and a curtain capped position, drive means for releasing said curtain feed roller to thereby permit said leading and following curtain means to traverse an exposure area with an exposure slit of predetermined width therebetween and wind about said spring powered take-up rollers and for subsequently rewinding said curtains upon said curtain feed roller, cam and rocker means coupled between said drive means and said oscillatable lever means for oscillating the latter from said slit defining position to said curtain capped position prior to said curtains being rewound upon said curtain feed roller and for thereafter returning said lever means to said slit defining position, and limit means for establishing the slit defining position of said oscillatable lever means.

3. An improved focal plane shutter mechanism comprising leading and following curtain means, a spring power take-up roller for each of said leading and following curtain means, a curtain feed roller common to both said leading and following curtain means, guide roller means for varying the position of said leading curtain relative to said following curtain, oscillatable lever means supporting said guide roller means for controllably oscillating the latter between a slit defining position and a curtain capped position, drive means for releasing said curtain feed roller to thereby permit said leading and following curtain means to traverse an exposure area with an exposure slit of predetermined width therebetween and wind about said spring powered take-up rollers and for subsequently rewinding said curtains upon said curtain feed roller, friction brake means for imparting a controlled decelerating force to both said leading and following curtain means after said exposure slit has traversed said exposure area, cam and rocker means coupled between said drive means and said oscillatable lever means for oscillating the latter from said slit defining position to said curtain capped position prior to said curtains being rewound upon said curtain feed roller and for thereafter returning said lever means to said slit defining position, and adjustable limit means for establishing the slit defining position of said oscillatable lever means.

4. An improved focal plane shutter mechanism comprising a leading and a following curtain, a spring power take-up roller for each of said leading and following curtains, and secured thereto, a curtain feed roller common to both said leading and following curtains, and secured to both, guide roller means for varying the position of said leading curtain relative to said following curtain, oscillatable lever means supporting said guide roller means for controllably oscillating the latter between a slit defining position and a curtain capped position, drive means including motor means for releasing said curtain feed roller to thereby permit said leading and following curtains to traverse an exposure area with an exposure slit of predetermined width therebetween and wind about said spring powered take-up rollers and for subsequently rewinding said curtains upon said curtain feed roller, friction brake means for imparting a controlled decelerating force to both said leading and following curtain means after said exposure slit has traversed said exposure area, cam and rocker means coupled between said drive means and said oscillatable lever means for oscillating the latter from said slit defining position to said curtain capped position prior to said curtains being rewound upon said curtains' feed roller and for thereafter returning said lever means to said slit defining position, adjustable limit means for establishing the slit defining position of said oscillatable lever means, and switching means synchronously actuated by said drive means for effecting switching functions during a shutter cycle.

5. An improved focal plane shutter mechanism in accord with claim 4 wherein said drive means comprises shutter rewind driver means and follower means therefore coupled between said motor means and said curtain feed roller to effect the release of said curtain feed roller from an initial position and subsequently to return said roller to said initial position.

6. In combination with a focal plane shutter mechanism of the type having a leading and a following curtain each with its own spring take-up roller, both curtains being secured to a common feed roller and having one of said curtains additionally passing over one or more guide roller means adjustable in position relative to said common feed roller to vary the width of an exposure slit formed between said curtains, a drive mechanism for releasing said curtains to permit their travel from a first to a second extreme position to effect an exposure and for subsequently returning said curtains to said first position, the improvement comprising;

oscillatable lever means supporting said guide roller means for movement relative to said common feed roller, limit means for establishing exposure slit width during curtain travel from said first to said second extreme positions, said limit means being adapted to establish a first limit of angular travel of said oscillatable lever means, and rocker means periodically actuated by said drive mechanism to effect oscillation of said lever means from said first limit of angular travel to a second limit of angular travel and subsequently back to said first limit of angular travel.

7. In combination with a focal plane shutter mechanism of the type having a leading and a following curtain each with its own spring take-up roller, both curtains being secured to a common feed roller and having one of said curtains additionally passing over one or more guide roller means adjustable in position relative to said common feed roller to vary the width of an exposure slit formed between said curtains, a drive mechanism for releasing said curtains to permit their travel from a first to a second extreme position to effect an exposure and for subsequently returning said curtains to said first position, the improvement comprising;

oscillatable lever means supporting said guide roller means for movement relative to said common feed roller, adjustable limit means for establishing a first limit of angular travel of said oscillatable lever means and thereby establish width of said exposure slit during curtain travel from said first to said second extreme positions, capping cam means actuated by said drive mechanism at least once during each cycle of shutter operation, and rocker means actuated by said capping cam means to effect oscillation of said oscillatable lever means from said first limit of angular travel to a second limit of angular travel and subsequently back to said first limit of angular travel to effect capping of said curtains during curtain movement from said second to said first extreme position.

8. In combination with a focal plane shutter mechanism of the type having a leading and a following curtain each with its own spring take-up roller, both curtains being secured to a common feed roller and having one of said curtains additionally passing over one or more guide roller means adjustable in position relative to said common feed roller to vary the width of an exposure slit formed between said curtains, a drive mechanism for releasing said curtains to permit their travel from a first to a second extreme position to effect an exposure and for subsequently returning said curtains to said first position, the improvement comprising;

oscillatable lever means supporting said guide roller means for movement relative to said common feed roller, limit means for establishing exposure slit width during curtain travel from said first to said second extreme positions, said limit means being adapted to establish a first limit of angular travel of said oscillatable lever means, friction brake means for applying a controlled decelerating force to said curtains after exposure and during curtain travel from said first to said second extreme positions, capping cam means actuated by said drive means during each cycle of shutter operation, capping control cam means connected to said oscillatable lever means for oscillation therewith, and rocker means actuated by said capping cam means for actuating said capping control cam means to effect oscillation of said oscillatable lever means from said first limit of angular travel to second limit of angular travel and subsequently back to said first limit of angular travel to effect capping of said curtains during curtain movement from said second to said first extreme position.

9. In combination with a focal plane shutter mechanism of the type having a leading and a following curtain each with its own spring take-up roller, both curtains being secured to a common feed roller and having one of said curtains additionally passing over one or more guide roller means adjustable in position relative to said common feed roller to vary the width of an exposure slit formed between said curtains, a drive mechanism for releasing said curtains to permit their travel from a first to a second extreme position to effect an exposure and for subsequently returning said curtains to said first position, the improvement comprising;

oscillatable lever means supporting said guide roller means for adjustable movement relative to said common feed roller, adjustable limit means for establishing exposure slit width during curtain travel from said first to said second extreme position, said adjustable limit means being adapted to establish a first limit of angular travel of said oscillatable lever means, friction brake means for applying a controlled decelerating force to said curtains after exposure and during curtain travel from said first to said second extreme position, capping cam means actuated by said drive means during each cycle of shutter operation, capping control cam means connected to said oscillatable lever means for oscillation therewith, rocker means actuated by said capping cam means for actuating said capping control cam means to effect oscillation of said oscillatable lever means from said first limit of angular travel to a second limit of angular travel and subsequently back to said first limit of angular travel to effect capping of said curtains during curtain movement from said second to said first extreme position, and electrical switching means coupled to said drive means for synchronous operation therewith, said electrical switching means comprising one or more cams axially aligned with each other and electrical switch means associated with individual ones of said cams and adapted to be actuated thereby to effect switching functions during a shutter cycle.

10. In the focal plane shutter mechanism according to claim 9, said electrical switching means comprising at least a cycle holding switch and associated cam, said cycle holding switch being adapted to maintain the application of power to said drive means for a sufficient portion of said shutter mechanisms' cycle of operation to insure completion of said cycle.

11. In the focal plane shutter mechanism according to claim 9, said electrical switching means comprising a first switch for braking control, a second switch for cycle holding and a third switch for shutter operation indication.

12. In the focal plane shutter mechanism according to claim 9, said adjustable limit means comprising both manual and servoed means each independently operable to effect adjustment of said first limit of said oscillating lever means to establish said exposure slit width.

References Cited by the Examiner
UNITED STATES PATENTS

| | | | |
|---|---|---|---|
| 2,192,500 | 3/1940 | Leitz | 95—57 |
| 2,335,690 | 11/1943 | Morse | 95—57 |

JOHN M. HORAN, *Primary Examiner.*

UNITED STATES PATENT OFFICE
CERTIFICATE OF CORRECTION

Patent No. 3,289,561 December 6, 1966

John A. Maurer

It is hereby certified that error appears in the above numbered patent requiring correction and that the said Letters Patent should read as corrected below.

Column 11, lines 18 and 19, strike out "a curtain feed roller common to both said leading and following curtain means," and insert instead -- a spring powered take-up roller for each of said leading and following curtain means, --.

Signed and sealed this 19th day of September 1967.

(SEAL)
Attest:

ERNEST W. SWIDER
Attesting Officer

EDWARD J. BRENNER
Commissioner of Patents